Patented Oct. 20, 1936

2,057,956

UNITED STATES PATENT OFFICE 2,057,956

PRODUCTION OF MONOCALCIUM PHOSPHATE

Oskar Kaselitz, Berlin, Germany

No Drawing. Application March 22, 1934, Serial No. 716,908. In Germany March 31, 1933

1 Claim. (Cl. 23—109)

My invention relates to the production of monocalcium phosphate $Ca(H_2PO_4)_2$, more especially from raw phosphate (tricalcium phosphate $Ca_3(PO_4)_2$) by decomposition with an acid such as sulfuric acid. It is an object of my invention to provide means whereby pure monocalcium phosphate can be produced in a particularly efficient and economical manner.

Amongst the phosphate fertilizers produced on a large scale the superphosphate plays a predominant role, since it is the only phosphate material commanding a comparatively low price, which contains phosphoric acid in the water-soluble form of monocalcium phosphate, which is absorbed by the plants with particular readiness. Unfortunately the superphosphate contains also a great many impurities, which considerably reduce its value as a fertilizer and increase the shipping costs. Obviously a monocalcium phosphate free from such impurities would be far more valuable as a fertilizer than the superphosphate nowadays used.

In view of this one has already produced calcium monophosphate by mixing phosphoric acid with tricalcium phosphate in the proportion required for the preparation of the monophosphate. However the product thus obtained, which is sold under the trade-name of double-superphosphate, contains all the impurities formed by the constituents of the phosphorites, which are insoluble in acid, and of phosphates, which are insoluble in water. Furthermore, in order to attain complete decomposition, phosphoric acid in excess of the calculated quantity must be added, so that even after the product has been dried, its strewing capacity remains unsatisfactory.

I avoid these drawbacks by producing crystallized calcium monophosphate from its solutions in a particularly simple and efficient manner. The ready solubility of monocalcium phosphate in water and in acid solutions is known to every chemist. Nevertheless it could not be expected that monophosphate could be prepared from raw phosphate by mere crystallization from its hot solution. I have succeeded in tracing a very simple process whereby a practically pure monocalcium phosphate, free from dicalcium phosphate $CaHPO_4$, can be obtained with good yield without any evaporation being required.

According to my invention I enter the raw phosphate under continuous stirring into the washing liquor resulting in prior operations and I heat the mixture in the presence of sulfuric acid added for this purpose. The quantities of raw phosphate and of sulfuric acid and the concentration of this acid are so chosen, that a solution is obtained which is completely saturated in the heat with monocalcium phosphate, while being almost saturated with dicalcium phosphate. For I have found that not only at the temperature, at which the raw phosphate dissolves in the acid, but also after this solution has cooled down, the diagrams illustrating the solubilities of the salts show the solution to lie in the monophosphate zone. Consequently, when the solution cools down, a monocalcium phosphate is obtained which is free from dicalcium phosphate, while at the same time the most favorable conditions for the production of monocalcium phosphate are given if the hot solution is also substantially saturated with dicalcium phosphate.

From the solution the undissolved residual matter, which is practically free from dicalcium phosphate, and the precipitated calcium sulfate are separated, while the solution is still hot, and are freed, by washing, from the solution still adhering thereto. The washing liquor thus obtained is returned into the process to be used for the solution of further quantities of raw phosphate. The clear hot phosphate solution is allowed to cool down and from this solution now separates out pure crystalline monocalcium phosphate, free from dicalcium phosphate, to be separated thereafter from the mother liquor by filtration. By centrifuging the contents of mother liquor still adhering to the salt can be greatly reduced. The product thus obtained, which need not be subjected to any drying operation, forms a strewable fertilizer containing but little free acid.

The cold mother liquor containing free phosphoric acid may be utilized in a well known manner in the production of other phosphates, such as for instance dicalcium phosphate and ammonium phosphate. I may however return it in a particularly advantageous manner into the process, the quantity of fresh sulfuric acid added to the solution being then reduced correspondingly. If the concentration of the sulfuric acid required for the decomposition is so chosen that also the water introduced in the form of washing water is disposed of under the form of crystal water of the monocalcium phosphate and calcium sulfate, the cold mother liquor from the monocalcium phosphate may be reused without previous evaporation. I thus obtain a cyclic process in which raw phosphate and sulfuric acid are introduced, while the whole of the phosphoric acid is obtained under the form of monocalcium phosphate free from dicalcium phosphate, the solutions resulting in this process being always returned into the process without previous evaporation.

In practising my invention I may for instance proceed as follows:—

Example 1

When operating the process without returning into it the mother liquor, I prepare the hot solution saturated at 100° C. with monocalcium phosphate by gradually mixing under stirring 628.2 kgs. $Ca_3(PO_4)_2$ with 983.3 kgs. sulfuric acid of 54.4% by weight and I finally heat this mixture to 100° C. There are formed 938.3 kgs. calcium sulfate, which is removed by filtering the hot solution and freed from the solution still adhering to it by washing with water. The washing liquors thus obtained are added to the acid used in the subsequent operation. Besides the calcium sulfate there are obtained 673.2 kgs. of a hot solution containing 5.20% (by weight) CaO, 42.73% $P_2O_5$ and 52.07% $H_2O$. This solution is cooled down to 25° C. for crystallization. The crystalline monocalcium phosphate separating out is freed from the mother liquor by filtration and centrifugation. I thus obtain 100 kgs. monocalcium phosphate and 573.2 kgs. mother liquor containing 2.25% CaO, 40.36% $P_2O_5$ and 57.40% $H_2O$. This mother liquor may be further treated in a well known manner for the production of other phosphates.

Example 2

When it is intended to return the mother liquor into the process, I prepare the hot solution saturated with monocalcium phosphate by mixing under stirring 122.8 kgs. $Ca_3(PO_4)_2$ with 113.5 kgs. sulfuric acid of 68.6% and the 573.2 kgs. mother liquor resulting in the preceding operation and I heat this mixture to 100° C. The calcium sulfate formed in the reaction is filtered, while the solution is still hot, and freed from the still adhering solution by washing with water, the washing liquors being added to the acid used in the subsequent operation. I obtain 136.6 kgs. calcium sulfate and 673.2 kgs. of a hot solution containing 5.20% CaO, 42.73% $P_2O_5$ and 52.07% $H_2O$. This solution is cooled down to 25° C. and pure crystalline monocalcium sulfate now separates out, which is filtered and centrifuged. I thus obtain 100 kgs. monocalcium phosphate and 573.2 kgs. mother liquor containing 2.25% CaO, 40.36% $P_2O_5$ and 57.40% $H_2O$. This mother liquor is returned into the process and added to the sulfuric acid to be used in the subsequent operation.

Various changes may be made in the details disclosed in the foregoing specification without departing from the invention or sacrificing the advantages thereof.

I claim:—

The method of producing pure monocalcium phosphate from raw phosphate and sulfuric acid comprising adding strong sulfuric acid and tricalcium phosphate in the proportion of about 2 mol. $H_2SO_4$ to 1 mol. $Ca_3(PO_4)_2$ to a liquor consisting of about 2.25% CaO, 40.36% $P_2O_5$ and 57.40% $H_2O$, heating this mixture to about 100° C., separating the solution while still hot from the calcium sulfate formed in the reaction, allowing the solution to cool down and monocalcium phosphate to crystallize out, until the mother liquor consists of about 2.25% CaO, 40.36% $P_2O_5$ and 57.40% $H_2O$, separating the crystallized monocalcium phosphate from the mother liquor and starting with the same the procedure anew.

OSKAR KASELITZ.